High-Speed Dynamic Braking

Fig. 5.

Field Reduction

Fig. 6.

Motoring

Fig. 7.

Braking Overload Protection

Fig. 8.

United States Patent Office 2,802,162
Patented Aug. 6, 1957

2,802,162
DYNAMIC-BRAKING CONTROL

Robert R. Lewis, Braddock Hills, Pa., assignor to Westinghouse Electric Corporation, East Pittsburgh, Pa., a corporation of Pennsylvania Application May 23, 1956, Serial No. 586,824

5 Claims. (Cl. 318—363)

This invention relates to heavy-duty dynamic-braking control, for rapid-transit electric trains and other purposes. The invention is concerned with the problem of discontinuing dynamic braking when heavy braking-currents are flowing, while quite high voltages are being generated by the motors. Such problems arise in changing from full-rate dynamic braking at high speeds, to motoring operation with power reapplied to the motors, and also in dynamic-braking overload-protection. The invention is also of particular significance when the sequentially operating circuit-switching devices are contacts or switches on controllers, which are switching-devices having a plurality of operating-positions and a plurality of contacts.

In rapid-transit service, the full-rate braking-voltage at high speeds is often too high for using an inexpensive single-break switching-contact. The equipment must be designed so that power can be reapplied to the traction-motors at any moment, even under these conditions. In some previous control-systems in which the circuit-controlling devices were separately energized contactors or unit-switches, with suitable interlocks between them, the dynamic-braking circuit could be interrupted with several simultaneous breaks, obtained with large, relatively costly, heavy-duty switching-devices, and the breaking of the circuit could thus be handled. But when the circuit-controlling devices are controllers, or multi-position circuit-make-and-break devices, it is not usually feasible to provide a plurality of serially connected circuit-breaking contacts, and it is not usually feasible or economical to put as much current or voltage capacity in each contact, as it the case with separately energized contactors or unit-switches. Consequently, in dynamic-braking traction-motor control-systems using controllers, it has heretofore been usual, before restoring power after a dynamic-braking operation, either to first rapidly run off the controller to its off-position, where additional resistance and/or field-shunting is inserted, to reduce the dynamic-braking current and voltage, before the final circuit-breaks were made; or to provide heavy-duty devices designed for opening the circuit under high-voltage conditions.

It is also necessary, as in all heavy-duty electric circuits, to provide overload-protection. During the dynamic-braking operation of traction-motor equipments, a braking-overload can occur, particularly during high-speed dynamic braking, when the circuit-controlling apparatus is in the wrong condition or position, either during single-car operation, or more often during multi-car or train-operation, when a malfunctioning car may be dragged along by the rest of the cars of the train. During such dynamic-braking overload-conditions, the motor current and voltage rapidly build up to a peak which imposes a severe burden on the circuit-interrupting apparatus.

According to my present invention, I use an entirely new principle of interrupting dynamic-braking circuits during conditions of high current and excessive voltage, whereby a field-reducing operation is first performed, lasting at least for some 20 milliseconds or the like, when the field-current through the motor-fields is reversed, before the dynamic-braking circuit is interrupted. During this brief time, the motor-flux, and consequently the motor-voltage and the motor-current, are all being rapidly reduced in value, so that, when the circuit-breaking operation is performed, it will be at a current and a voltage which is not abnormal. This field-reducing operation is timed, in the case of going from braking to power-operation, so that the residual fields of the motors will never be substantially killed, or reversed. I accomplish this field-reducing operation by completing a circuit around each motor-armature and through its own series field-winding, without reversing either the field-winding or the armature (which, of course, would have entailed a circuit-breaking operation during conditions of high current and high voltage). This series connection of each motor-armature with its own field-winding may be accomplished either with, or without, an external circuit-resistance, as will be hereinafter explained.

An exemplary form of embodiment of my invention, illustrative of the principles which are involved, is shown in the accompanying drawing, in a much simplified and somewhat diagrammatic form, not to scale. In the drawing.

Figure 1:
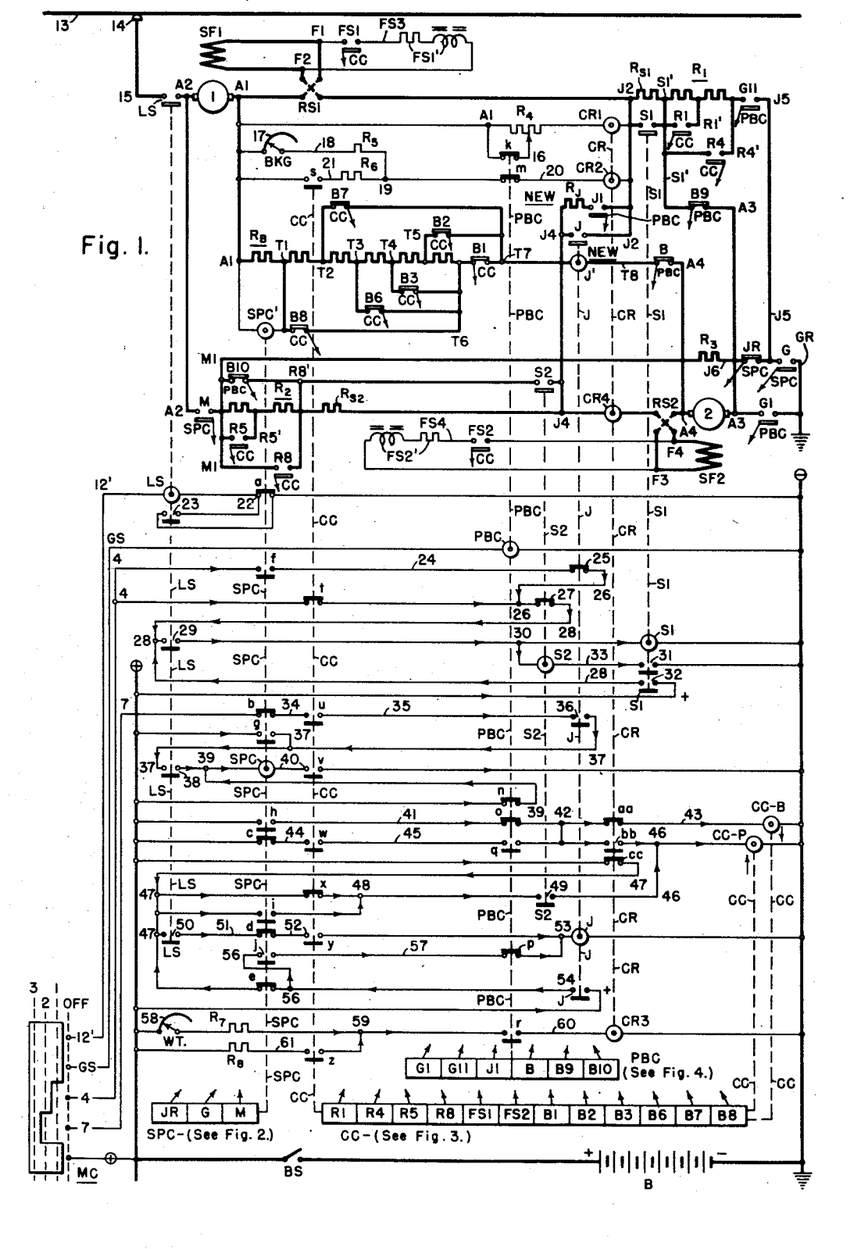
Figure 1 is a simplified circuit-diagram.

Fig. 1 represents some of the equipment which is carried by a single electrically propelled railway-car embodying my invention. Direct-current power is supplied to the car from a positive trolley-wire or third-rail 13, which is engaged by a third-rail shoe 14 or other current-collecting equipment, carried by the car. The third-rail shoe 14 energizes a line 15 which constitutes a direct-current power-supply circuit for the car. The traction-motors for the car are series direct-current motors, which are indicated, by way of simple example, in Fig. 1, as comprising two motor-armatures 1 and 2, each being associated with its own series field-winding SF1 or SF2, respectively, through the usual reversing-switches RS1 or RS2, respectively.

Fig. 1 illustrates a series-parallel motor-control arrangement, with provisions for dynamic-braking circuits in which one motor-armature energizes the field-winding of the other motor during dynamic braking. The equipment illustrated in Fig. 1 includes a line-switch LS, two main switches or starting-contactors S1 and S2, a transition-contactor J, a current-limit relay CR, a series-parallel cam-switch controller SPC, a cam-controller CC, and a power-brake-changeover cam-switch controller PBC.

All of the switches, contactors, relays and controllers which are shown in Fig. 1 are electrically controlled. They are diagrammatically indicated, in Fig. 1, as having vertical switch-stems (indicated by dotted lines) which are biased by gravity toward their lowermost positions, and all of these switches and relays are shown, in Fig. 1, in their deenergized or non-actuated positions. All of the relays and switches are illustrated, in Fig. 1, as being electrically or magnetically operated, by means of an appropriately numbered or lettered coil or solenoid, represented by a circle, acting magnetically to lift an armature which is represented diagrammatically by a smaller circle inside of the coil-circle. In general, the same switch-designation is applied to any particular switch, its coil, and its contacts, by way of identification of the parts belonging to a given switch or relay.

The line-switch LS, the two main switches S1 and S2, and the transition-switch J all have a main contact which is designated by the same letter as the switch. Each of these switches has a battery-energized operating-winding which is also designated by the same letter as the switch, and each of these switches also has a number of auxiliary control-circuit contacts which will be hereinafter described. In addition, according to one feature of my present invention, the transition-switch J is provided with a second operating-coil J', which serves as an overload operating-coil during the dynamic-braking operation, as will be subsequently described.

The limit-relay CR is illustrated as having four operating-coils CR1, CR2, CR3 and CR4, all operating cumulatively, through various energizing-circuits which will be described; and it also has a back-contact *aa*, a make-contact *bb*, and another back-contact *cc*.

Figure 2:
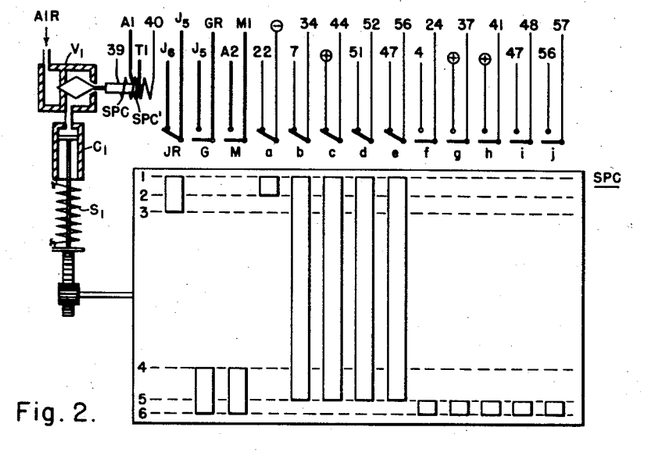
Figs. 2, 3 and 4 are simplified development-diagrams of the three different air-motor-operated controllers which are used in the exemplary form of embodiment.

The series-parallel controller SPC has three main power-switches or contacts, JR, G and M, and as illustrated it has ten auxiliary contacts *a, b, c, d, e, f, g, h, i* and *j*. In the form shown in Fig. 2, the series-parallel controller C has a drum, carrying suitable cams for operating the several contacts, in accordance with, say, six main drum-positions numbered 1 to 6. This SPC drum is spring-returned, by a tension-spring $S_1$, to its series-motor-connection position, No. 1, in which the series-connection switch JR is closed; and the drum is actuated to its parallel-motor-connection position, No. 6, by means of an air-engine consisting of a cylinder $C_1$, which is supplied with compressed air through a standard (or normally closed) valve $V_1$, as shown in Fig. 2. The standard valve $V_1$ is provided with two, cumulatively acting, valve-magnet windings, namely, a main, battery-energized winding SPC, and an auxiliary winding or holding-coil SPC' which is connected across a part of the braking-circuit resistance as will be subsequently explained. In Fig. 1, however, for the purpose of a simple diagrammatic illustration, the series-parallel controller SPC is illustrated as if its two operating-windings SPC and SPC' were solenoid-coils, pulling up on armatures which lift a vertical switch-stem SPC carrying the several controller-contacts.

Figure 3:
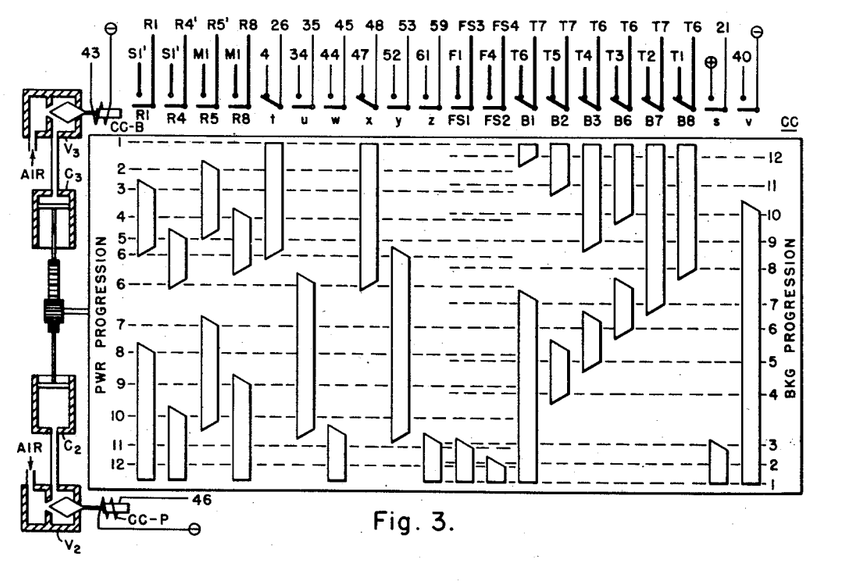

The cam-controller CC is illustrated in a simplified form, as having twelve main contacts, R1, R4, R5, R8, FS1, FS2, B1, B2, B3, B6, B7, B8; and eight auxiliary contacts *s, t, u, v, w, x, y* and *z*. Actually, as shown in Fig. 3, it is provided with a drum, carrying cams for actuating the respective contacts, as the drum is rotated in one direction during the power-progression acceleration, or as the drum is actuated in the reverse direction during the dynamic-braking progression. In the simplified controller which is illustrated in the drawing, there are twelve power-progression positions of the cam-controller drum, numbered PWR Progression positions Nos. 1 to 12 in Fig. 3, and there are also twelve braking-progression positions of the controller-drum, numbered BKG Progression positions Nos. 1 to 12, although it is to be understood, of course, that any desired number or refinements of progression-positions might be used, during either the power or the braking operation.

Actually, as shown in Fig. 3, the cam-controller CC is operated by an air-engine consisting of two opposed cylinders $C_2$ and $C_3$, which are supplied with compressed air under the control of two inverted (or normally open) valves $V_2$ and $V_3$, respectively. The first inverted valve $V_2$ is provided with a valve-magnet coil CC—P which, when energized, shuts off the air-supply to the cylinder $C_2$ and allows said cylinder $C_2$ to exhaust, while permitting the other cylinder $C_3$ to operate the CC drum in the direction of the power-progression. The second inverted valve $V_3$ is provided with a valve magnet winding CC—B, which, when energized, shuts off the air-supply to the cylinder $C_3$ and allows said cylinder $C_3$ to exhaust, while permitting the other cylinder $C_2$ to actuate the drum in the direction of the braking-progression. When neither of the valve-magnet windings CC—P nor CC—B is energized, the compressed air is admitted to both cylinders $C_2$ and $C_3$, and the drum is locked stationary, in whatever position it occupies at the time. In Fig. 1, however, for the purpose of a simplified diagrammatic illustration, the cam-controller CC is illustrated as if the valve-magnet windings CC—P and CC—B were long solenoids, pulling up and down, respectively on valve-stems CC, as indicated by the arrows placed close to these coils in Fig. 1.

The power-brake controller PBC is illustrated as having six main contacts B10, B9, B, J1, G1 and G11 and in the illustrated form of embodiment it has seven auxiliary contacts *k, m, n, o, p, q,* and *r*. In the form shown in Fig. 4, it is provided with a drum, carrying cams for operating the respective contacts, in accordance with the several main drum-positions, such as the positions marked from 1 to 7. This PBC drum is spring-returned, by a tension-spring $S_4$, to its braking-position, No. 1; and it is actuated to its power-position, No. 7, by an air-engine consisting of a cylinder $C_4$ which is supplied with compressed air under the control of a standard valve $V_4$ which is provided with a valve-magnet winding PBC. In Fig. 1, however, for the purpose of a simplified diagrammatic illustration, the power-brake controller PBC is illustrated as if it were a solenoid-operated switch, with the solenoid-coil PBC pulling up on an armature which lifts the switch-stem PBC.

In Fig. 1, the main motor-circuits are indicated in heavy lines. With the series-motor-combination connections, power is supplied from the supply-circuit 15 through the line-switch LS to an armature-terminal A2, and thence through the armature 1 to its other armature-terminal A1, then through the series field-winding SF1, an intermediate terminal J2, a starting-resistance $R_{S1}$, an intermediate S1', a variable accelerating-resistance $R_1$, an intermediate terminal R4', the main contact G11 of the power-brake controller PBC, and thence to an intermediate terminal J5, which completes the connections for the first motor 1. From the intermediate terminal J5, a circuit is completed, through the series-motor contact JR of the series-parallel controller SPC, to an intermediate terminal J6, and thence through a series-circuit resistance $R_3$ to an intermediate terminal M1. From the intermediate terminal M1, the circuits of the second motor 2 commence, beginning with a variable accelerating resistance $R_2$ and continuing thence to an intermediate terminal R8', and thence to a starting-resistance $R_{S2}$, an intermediate terminal J4, the series limit-relay coil CR4, the series field-winding SF2, an armature-terminal A4, the armature 2, its other armature-terminal A3, the main contact G1 of the power-brake controller PBC, and thence to the grounded rail-connection GR which constitutes the negative circuit of the trolley supply-system.

In Fig. 1, the parallel-motor-operation connections are completed when the series-parallel controller SPC is actuated (as will be subsequently described), whereby its series-motor contact JR is opened and its parallel-motor contacts G and M are closed. The contact M is connected between the armature terminal A2 and the intermediate terminal M1, thus completing a line-to-ground circuit through the second motor 2. The contact G is connected between the intermediate terminal J5 and the ground-terminal GR, thus completing the line-to-ground connection of the first motor 1.

In Fig. 1, the dynamic-braking circuits are established when the power-brake controller PBC is in its No. 1, or braking, position, in which the motor-circuit contacts G1 and G11 are open, and the braking-circuit contacts B, B9 and B10 are closed. The contact B completes a circuit from the armature-terminal A4 to an intermediate terminal T8, and thence through my new braking-overload coil J' to an intermediate terminal T7, then through a variable braking-resistance $R_B$ to the armature-terminal A1. The contact B9 makes a circuit-connection between the intermediate terminal S1' and the armature-terminal A3. The contact B10 completes a circuit between the intermediate terminal M1 and the intermediate terminal R8'. This completes the usual dynamic-braking connection, which is typical of series-parallel traction-motor control-systems.

With these dynamic-braking connections, the No. 1 motor-armature energizes the No. 2 motor's series field-winding SF2 in the same polarity as the residual magnetism of said No. 2 motor, through a direct-current circuit starting from the armature-terminal A1 and thence through the armature 1 and the terminals A2, M1, R8' and J4 to said field-winding SF2, and thence through the terminal A4 and the braking-resistance R_B back to the armature-terminal A1. A similar circuit is traceable through the second motor-armature 2, starting with the armature-terminal A3, the armature 2, the armature-terminal A4, the common braking-circuit including the resistance R_B, the armature-terminal A1, the series field-winding SF1 of the motor 1, and thence through the terminals J2 and S1' back to the armature-terminal A3.

As shown in Fig. 1, the cam-controller CC carries three groups of resistance-shorting contacts R1 to R4, R5 to R8, and B1 to B8, for shorting out portions of the respective variable resistances R_1, R_2, and R_B. In order to simplify the drawing, two of the resistance-shorting contacts have been omitted from each of the contact-groups R1 to R4, R5 to R8, and B3 to B6. The cam-controller CC also carries a plurality of field-shunting contacts, of which only two contacts, FS1 and FS2, are shown, for the purpose of connecting field-shunts FS1' and FS2' across the respective series field-windings SF1 and SF2, in one field-reducing step for each series field-winding. This is intended to be representative of any desired number of field-reducing steps, as will be well understood.

The main motor-circuits of Fig. 1 also include energizing-circuits for the first and second limit-relay windings CR1 and CR2, and for the auxiliary winding SPC' of the series-parallel controller SPC. Thus, the first limit-relay rerate-coil CR1 is connected between the intermediate terminals A1 and J2, in series with a resistance R4; and a part of this resistance R4 is shorted out under the control of the auxiliary back-contact k of the power-brake controller PBC, which is connected in the circuit between the points A1 and 16.

The second limit-relay rerate-coil CR2, as shown in Fig. 1, is also connected between the intermediate terminals A1 and J2, in a circuit which may be traced through a braking-responsive rheostat 17, a circuit 18, a resistance R_5, a circuit 19, the auxiliary back-contact m of the power-brake controller PBC, and a circuit 20 to said CR2 coil and thence to the intermediate terminal J2 of the main motor-circuits. Another connection is made between the armature-terminal A1 and the circuit 19, through the make-contact s of the cam-controller CC, a circuit 21, and a resistance R_6. The braking-responsive rheostat 17 is automatically changed in response to the position of a brake-handle, which may be considered to be diagrammatically indicated by the movable contact-arm of said rheostat 17, so that, when a vehicle-braking operation is called for by the operator of the vehicle, more and more of the braking-rheostat 17 is introduced into circuit, as a greater and greater intensity of braking-effort is called for by the operator, thus recalibrating the limit-relay CR according to the amount of braking-effort which is desired by the operator.

As shown in Fig. 1, the auxiliary operating-coil SPC' of the series-parallel controller SPC is energized across a permanent circuit-portion, A1–T1, of the braking-resistance R_B, this being a resistance-portion which is not shorted out by any of the resistance-shorting switches B1 to B8. This auxiliary coil SPC' thus serves as a holding-coil for the series-parallel controller SPC during the braking-operation, so that it will hold this controller in its parallel-motor-connection position, even after the battery-energized coil SPC is deenergized, as by the opening of the auxiliary contact v of the cam-controlled CC during the baking-progression of the cam-controller. Said holding-coil SPC' holds the series-parallel controller SPC energized until after brake-fadeout, whereupon the said series-parallel controller SPC drops back to its series-motor-connection position, in readiness for another motoring operation of the traction-motors 1 and 2.

In Fig. 1, the control-circuits which are located underneath the main, heavy-line motor-circuits, are battery-energized from positive and negative buses (+) and (−), which are connected across a battery B through a battery-switch BS which is shown at the bottom of the diagram. These control-circuits are controlled by a master controller MC, which is shown, in a simplified form, as energizing four train-line wires 12', GS, 4 and 7. The master controller MC has an off-position and three power-on positions, 1, 2 and 3. In its positions 1, 2 and 3, the master controller energizes the two train-line wires 12' and GS from the positive bus (+). In its positions 2 and 3, the master controller MC energizes the train-line wire 4 from the positive bus (+). In its position No. 3, the master controller MC energizes the train-line wire 7 from the positive bus (+).

The first battery-energized control-circuit of Fig. 1 is shown as being energized by the train-line wire 12', which energizes the line-switch operating-coil LS in series with a circuit 22 and the auxiliary back-contact a of the series-parallel controller SPC, the circuit being completed at the negative bus (−). The SPC contact a is bypassed by a holding-circuit including a make-contact 23 of the line-switch LS, so as to thereafter hold the line-switch energized, unaffected by a subsequent operation of the series-parallel controller SPC, as long as the master controller MC is on any one of its on-positions 1, 2 or 3.

The second battery-energized control-circuit of Fig. 1 is energized from the train-line wire GS which is connected to the operating coil PBC of the power-brake controller, the circuit being completed at the negative bus (−).

Next comes a battery-energized circuit under the control of the train-line wire 4, which includes the auxiliary make-contact f of the series-parallel controller SPC, a conductor 24, a back-contact 25 of the transition-contactor J, a circuit 26, a back-contact 27 of the second starting-contactor S2, a circuit 28, a make-contact 29 of the line-switch LS, a circuit 30, and thence to the operating coil S1 of the first starting-contactor S1. This circuit is completed, as are all of the battery-energized circuits, at the negative bus (−). The part of the S1 energizing-circuit, 4—f—24—25—26 is not energized in the initial series-motor-combination position of the series-parallel controller SPC, because of the initially open controller-contact f, this circuit-portion being useful only in the event that a power-reapplication is initiated at a car-speed where the fully advanced cam-controller CC has not returned to its full-field position in which its contact u is closed. This circuit-portion 4—f—24—25—26 is bypassed by the auxiliary back-contact t of the cam-controller CC, which joins the circuits 4 and 26 during the initial power-progression positions of the cam-controller, and up to the point (position 6), where a transition is about to be made from the series to the parallel motor-connection.

When the first starting-contactor S1 picks up, it closes its auxiliary make-contacts 31 and 32. The contact 31 energizes the operating coil S2 of the second starting-contactor S2, in a circuit which extends from the conductor 30, through the S2 coil to a conductor 33, and thence through the contact 31 to the negative bus (−). The S1 contact 32 completes a hold-circuit between the positive bus (+) and the circuit 28, thereafter holding the two starting-contactors S1 and S2 closed, as long as the line-switch make-contact 29 remains closed.

The two starting-contactors S1 and S2 thus pick up when the master controller MC is in, or is moved to, its No. 2 position, where it energizes the train-line wire 4.

The main contacts S1 and S2 of these starting-contactors short out the two starting-resistances Rs1 and Rs2, thus constituting the first step in a series of successive resistance-reducing steps, whereby the serially connected accelerating resistances are gradually cut out of the motor-circuit while the motors are connected in series with each other. When the second starting-contactor S2 picks up, it closes a make-contact 49, which, as will be subsequently described, initiates the automatic power-progression of the cam-controller CC, under the control of the limit-relay back-contact cc. The No. 2 master-controller position thus constitutes the series-motor position of the controller, as contrasted with the No. 1 master-controller position, which serves as a "switching" position for causing a slow movement of the train, for so-called "switching" purposes, with all of the accelerating-resistances in series with the motors.

When the master controller MC is in, or is moved to, its No. 3 position, the train-line wire 7 is energized, thus starting a circuit through the auxiliary back-contact b of the series-parallel controller SPC, a conductor 34, the auxiliary make-contact u of the cam-controller CC, a conductor 35, a make-contact 36 of the transition-contactor J, a conductor 37, an auxiliary make-contact 38 of the line-switch LS, a conductor 39, the main operating-coil SPC of the series-parallel controller SPC, a conductor 40, the make-contact v of the cam-controller CC, and thence to the negative bus (—). It will thus be seen that the energization of the series-parallel controller SPC, for actuating it from its series-motor position to its parallel-motor position, is under the joint control of the No. 3 master-controller position, which energizes the wire 7, and the No. 6 power-progression position of the cam-controller CC, which energizes the auxiliary contact u, as shown in Fig. 3. Soon after the series-parallel controller SPC has closed its parallel-motor contacts G and M, thus establishing the parallel-motor circuits, as in position No. 4 of the series-parallel controller in Fig. 2, said controller reaches its position No. 5, at which it closes its auxiliary contact g, and reference to Fig. 1 will show that this SPC contact g completes a holding-circuit from the positive bus (+) to the conductor 37, thus insuring the continued energization of the series-parallel controller SPC after the dropping-out of the transition-contactor J and its make-contact 36.

Another energizing-circuit for the energizing-wire 39 of the SPC coil is provided from the positive bus (+) through the back-contact n of the power-brake controller PBC, so that the braking position of the power-brake controller will bring about the energization of the SPC coil, provided that the cam-controller CC is in any one of its first ten braking-progression positions in which its auxiliary contact v is closed, in the negative circuit 40 of the SPC coil, as shown in Fig. 1.

Next, in Fig. 1, comes a circuit 41, which is energized from the positive bus (+) through the auxiliary make-contact h of the series-parallel controller SPC. The circuit 41 extends on through the auxiliary back-contact o of the power-brake controller PBC, and thence to a conductor 42, and then on through the back-contact aa of the limit-relay CR to the energizing-circuit 43 of the braking-progression coil CC—B of the cam-controller CC.

Next, in Fig. 1, comes a circuit 44, which is energized from the positive bus (+) through the auxiliary back-contact c of the series-parallel controller SPC. The circuit 44 continues on, through the auxiliary make-contact w of the cam-controller CC, a conductor 45, and the auxiliary make-contact q of the power-brake controller PBC, to the previously mentioned circuit 42, which energizes the braking-progression coil CC—B through the limit-relay back-contact aa. This circuit 42 also extends on, through the limit-relay make-contact bb, to the energizing-circuit 46 of the power-progression coil CC—P of the cam-controller CC. The limit-relay make-contact bb is useful during dynamic braking (when the circuit 41 is energized), for correcting a very excessive braking-current by back-stepping the cam-controller CC by energizing the power-progression coil CC—P.

Next below the circuits 44—45, in Fig. 1, the positive bus (+) is connected to the back-contact cc of the limit-relay CR, and thence to a conductor 47 which is used for a number of different purposes under the limit-relay control. From this conductor 47, a first circuit extends on, through the auxiliary back-contact x of the cam-controller CC, to a conductor 48, and thence through the previously mentioned auxiliary make-contact 49 of the second starting-contactor S2, to the previously mentioned energizing-conductor 46 of the power-progression coil CC—P. Thus, the cam-controller progresses, in its motoring direction, under the control of the limit-relay contact cc, until the cam-controller CC completes its power-progression position No. 6 (Fig. 3), at which time it opens its auxiliary contact x in the circuit 47—48, this operation being contingent upon an actuated or closed position of the second starting-contactor S2, in the circuit-portion 48—49—46. A bypass-circuit is provided, between the conductors 47 and 48, around the CC contact x, by means of the auxiliary make-contact i of the series-parallel controller SPC, which closes after this series-parallel controller has completed the closure of the parallel-motoring main-contacts G and M.

The circuit 47, in Fig. 1, is also connected to an auxiliary make-contact 50 of the line-switch LS, and thence, through a conductor 51, the auxiliary back-contact d of the series-parallel controller SPC, a circuit 52, and the auxiliary make-contact y of the cam-controller CC, to the energizing circuit 53 of the main battery-energized operating-coil J of the transition-contactor J. It will be noted that this battery-energization of the J coil is contingent upon a closed position of the line switch LS, which closes the line-switch contact 50, and it is also contingent upon the closure of the cam-controller auxiliary contact y, which does not occur until the beginning of the No. 6 power-progression position of the cam-controller CC, as shown in Fig. 3. When the transition-contactor J closes, its main contact J joins the intermediate points J2 and J4 in the main power-circuits, thus bypassing the series-motor resistor R3, and establishing the full-series motor-connection.

As soon as the transition-contactor J closes, it closes its auxiliary make-contact 54, which completes a circuit from the positive bus (+) through said contact 54 to a conductor 56, and thence, through the SPC back-contact e, to the previously mentioned conductor 47, to bypass the CR contact cc, to keep the cam-controller CC moving, so as to be in a correct position for a transition from series to parallel operation.

Also, in accordance with one phase of my invention, the conductor 56 is joined, by the SPC make-contact j, to a conductor 57, and thence through the PBC back-contact p to the energizing-circuit 53 of the battery-energized coil J of the transition-contactor J, so as to constitute a hold-circuit for the contactor J during brake-overload.

The penultimate control-circuit in Fig. 1 leads from the positive bus (+) to a weight-responsive rheostat 58, and thence through a resistor R7 to a circuit 59, which extends on through the PBC make-contact r to the energizing-circuit 60 of the third rerating coil CR3 of the limit-relay CR. In accordance with a standard practice, the weight-responsive rheostat 58 is automatically adjusted according to the variable weight or live load carried by the car, so that the rate-coil CR3 is the most strongly excited during light-load conditions, thus reducing the minimum-current setting, at which the limit-relay CR picks up and opens its back-contacts aa and cc. The intermediate energizing-circuit 59 of this rate-coil CR3 is also provided with an alternative energizing-circuit which extends from the positive bus (+) through a resistor R8 and a conductor 61 to the auxiliary make-contact z of the cam-controller CC, and thence to said circuit 59.

The novel features of my invention include, first, the addition of a main-circuit connection which includes the contact J1 of the power-brake controller PBC, and, (preferably also) a serially connected resistance $R_J$, between the main-circuit points J4 and J2; and second, the insertion of the brake-overload coil J' in series in the braking circuit T7—T8. The remaining parts of the main circuits are, or may be, conventional, and the control-circuits and the control-sequence may also be conventional, except as my novel features are concerned. It is believed, therefore, that no further discussion of the control-circuits or o the operational sequence will be needed, other than to point out the significance of these novel features.

Both features of my invention concern the problem of economically interrupting the dynamic-braking circuit when the braking-current is high and the braking-voltage is too high for economical current-interruption.

Figure 5:
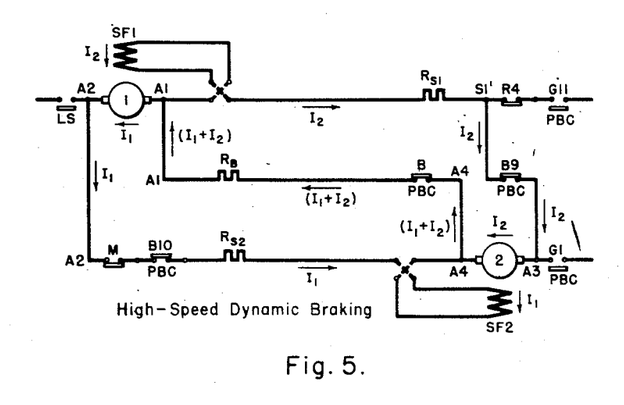
Figs. 5, 6, 7 and 8 are simplified control-circuits of the basic connections which are obtained during different operating-conditions of the traction-motor equipment.
Figure 7:
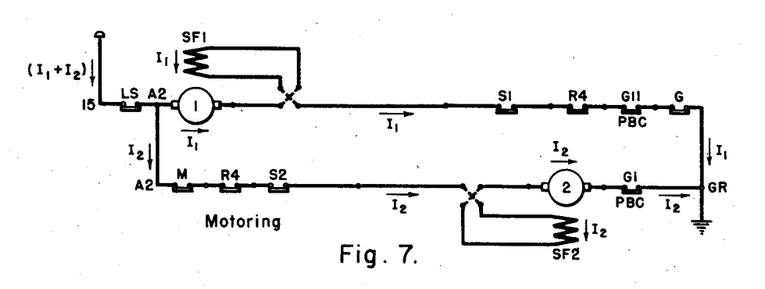

In Fig. 1, the portion of the main circuit, containing the J1 contact and its serially connected resistance $R_J$, concerns the problem of changing from high-speed dynamic braking, when the circuits are as shown in Fig. 5, to a resumption of a motoring operation, with power re-applied, when the circuits are as shown in Fig. 7. When the vehicle is operating at high speeds, the traction-motors 1 and 2 necessarily are, or have been, operating in their parallel-motor connection, with power applied, with all of the accelerating-resistances $R_{S1}$, $R_1$, $R_2$ and $R_{S2}$ cut out, and with a considerable amount of field-shunting in effect. Usually, there are a plurality of steps of field-shunting, which are in use from perhaps 40% of full speed until full speed is reached. Reference to Fig. 3 will show that this means that the cam-controller CC has been advanced, in its power-progression direction, to beyond the full-parallel full-field position, which is indicated as No. 10 in Fig. 3.

When dynamic braking is entered into, or coasting, which is very gentle dynamic braking—as by returning the master-controller MC to its off-position—under these high-speed conditions, it means that all of the accelerating resistances have been shorted out, except that the starting-resistances $R_{S1}$ and $R_{S2}$ may be, and usually are, restored into service, and all of the braking-circuit resistance $R_B$ is in service. The motor-fields have substantially their maximum amount of field-shunting, when dynamic braking is first entered into, under these conditions, but if the full dynamic-braking effect is called for, by the manipulation of the brake-lever or movable-arm-member of the braking rheostat 17 in Fig. 1, the cam-controller CC of Fig. 3 will be rapidly notched backwardly by the closed limit-relay contacts aa in Fig. 1, which means that the cam-controller is being advanced in the direction of its braking progression, until very little or no field-shunting is in effect, or until about the braking-progression position No. 3 in Fig. 3, at which time the braking-current will have been increased to its full braking-current value; but, in general, substantially all of the braking resistance $R_B$ will still be in circuit. Under these circumstances, the traction-motors 1 and 2 will be heavily excited, while operating at their full speed, which means that the generated voltages in the motor-armatures will be very high, usually very considerably higher than the maximum armature-voltage which is applied to the motors during their full-speed power-operation.

If, now, while the motors are still operating in their dynamic-braking connection, at nearly the top motor-speed, with full-braking current, and with excessive motor-voltages, the operator of the vehicle wishes to discontinue the dynamic braking and to resume the power-operation (as the operator must certainly be permitted to do), the operator brings about the interruption of the dynamic-braking circuit by moving the master controller MC to one of its on-positions, probably the full-on position No. 3. This causes the energization of the GS wire, which picks up the power-brake controller PBC, and begins to move it from its spring-biased braking-position, which is No. 1 in Fig. 4, to its energized or motoring-position, which is No. 7 in Fig. 4. In one exemplary form of embodiment of my invention, this full-movement operation of the power-brake controller PBC requires about .24 second, although, of course, I could have used any other convenient operating-time.

Figure 4:
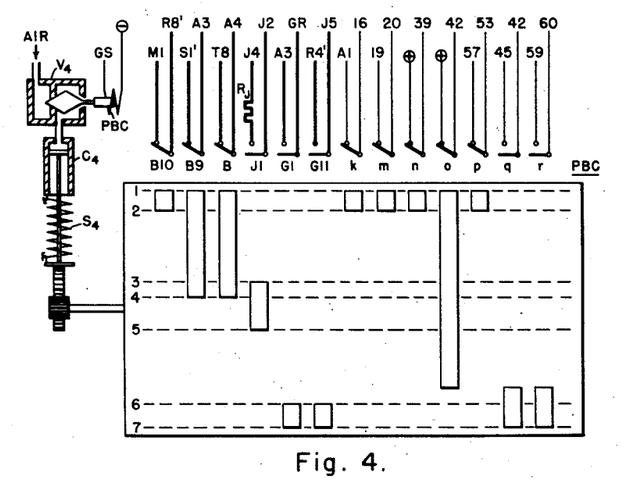

It will be noted, from Fig. 4, that, at a certain intermediate position in the movement of the power-brake controller PBC, as when it is in its position marked No. 4, its braking-circuit contact B is opened, the effect of which is to open the dynamic-braking circuit, as will be evident from Fig. 5. The difficulty of opening this braking-circuit contact B, while the motors are generating their very high voltages during high-speed full-braking operation, is the difficulty which is overcome by my addition of the J1 contact on the power-brake controller PBC, as shown in Fig. 4. As shown in Fig. 4, this added contact J1 is closed, in the position numbered 3, shortly before the opening of the braking-contact B; and said J1 contact is reopened, in position No. 5, shortly after the opening of the braking-contact B, when there is a reduced field-flux (but still a substantial flux) in the traction-motors 1 and 2, and before the closure of the two power-contacts G1 and G11 in the position numbered 6 in Fig. 4.

Figure 6:
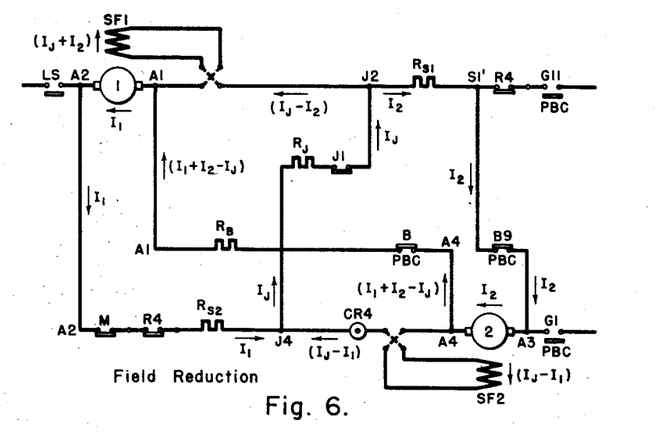

The effect of the closure of the PBC contact J1 is to establish the field-reduction circuits shown in Fig. 6. It will be noted that the J1 contact closes a circuit, preferably including a resistance $R_J$, around the terminals of each of the motors 1 and 2, with each of these motor-circuits including its own unreversed series field-winding SF1 or SF2, as the case may be. The effect of this is to circulate a current-component $I_J$ in a reverse-direction or demagnetizing direction through each of the field-windings, in addition to the normal braking-currents $I_1$ and $I_2$ which are shown in Figs. 5 and 6.

It is usually desirable that the J1-circuit resistance $R_J$ shall be smaller than the braking-resistance $R_B$, so that the total or actual field-current, in each of the field-windings, shall be reversed, so as to actively buck down the field-flux which was present in each motor during the dynamic-braking connections of Fig. 5. Usually, if the J1-circuit resistance RJ were zero (or omitted entirely), this field-bucking action would be too severe, at high motor-speeds and full-braking currents $I_1$ and $I_2$, and there would be too much risk of substantially killing the residual motor fields, or even reversing these residual fields, which would make it impossible to obtain dynamic braking again, until after power has been reapplied to the motors. After something like .02 second (more or less), of the field-reducing connections shown in Fig. 6, the airgap-fluxes of the motors 1 and 2 will have been reduced sufficiently so that, even at the highest motor-speeds, the generated motor-voltages will have been reduced to normal values, or nearly enough normal values, so that the braking-circuit contact B can safely interrupt the braking-circuit ($I_1 + I_2 - I_J$), without building extra circuit-interrupting ability into this contact. It is obvious, of course, that the magnitude of the field-reducing current-component $I_J$ should be so correlated with the operational time of the power-brake controller PBC, that the herein-discussed operation will take place.

The circuit containing the field-reducing PBC contact J1 should be reopened, either immediately and automatically after the PBC braking-contact B opens, or usually at some convenient brief time thereafter, as indicated by the time required for the PBC controller to move from its No. 4 position to its No. 5 position, in Fig. 4, and certainly before the closure of the power-circuit contacts G1 and G11 in PBC position No. 6. Here, again, the relation between the field-reduction current I_J (which is now rapidly becoming smaller, as the armature-voltages decrease), and the time during which this current continues, after the opening of the braking-contact E, should be so chosen as to avoid either killing or reversing the residual fields of the motors.

From the moment when the field-reducing contact J1 was first closed, in the No. 3 position of the power-brake controller PBC, the current through the main series limit-relay coil CR4 was sharply reduced, to the value $(I_J-I_1)$, as shown in Fig. 6.

When the power-brake controller PBC first started to pick up, so as to move out of its braking-position No. 1 in Fig. 4, say at its position No. 2, it opened its auxiliary contact n. As shown in Fig. 1, this opening of the PBC n contact deenergized the hold-circuit for the energizing conductor 39 of the operating-coil SPC of the series-parallel controller, causing this SPC controller to drop out from its parallel-position No. 6 in Fig. 2, and to start to move toward its series position No. 1 in Fig. 2. When the series-parallel controller SPC first begins to drop out of its parallel-position No. 6, say in its position No. 5, it closes its back-contact c in the circuit 44 in Fig. 1, and it opens its contact h in the circuit 41 in Fig. 1. The power-brake controller PBC opens its auxiliary contact o and closes its auxiliary contact q near the end of its pickup-movement, say just before its No. 6 position in Fig. 4, thus opening the circuit h—41—o—42 in Fig. 1, and simultaneously establishing a bypassing circuit c—44—w—45—q—42, thus insuring the deenergization of the braking-progression coil CC—B unless the cam-controller CC is in one of its field-shunting positions, in which case its contact w will be closed.

When the power-brake controller PBC reaches its power-positions 6 and 7 (Fig. 4), it closes its power or motoring contacts G1 and G11; and when the series-parallel controller SPC reaches its series-motor positions 1, 2 and 3 (Fig. 2), it closes its series-connection contact JR. The only thing now needed, in order to establish the series-motor power-connection, is to energize the line-switch LS, which is accomplished by the series-parallel controller SPC when it closes its auxiliary contact a in its positions 1 and 2 in Fig. 2. As shown at the circuit 12'—LS—a in Fig. 1, the line-switch LS will thus be energized, and when its main contact LS is closed, in the main motor-circuits, its auxiliary contact 50 will thereupon immediately energize the transition-contactor coil J, in the circuit 51—d—52—y—53 in Fig. 1, provided that the braking-operation had not continued long enough to cause the cam-controller to reach any one of its series-motoring PWR positions Nos. 1 to 5, in which the CC contact y is open, as shown in Fig. 3.

The transition-contactor's make-contact 36 will thereupon immediately reenergize the circuit 35—36—37 of the series-parallel controller SPC, assuming that the master-controller MC is in its No. 3 or parallel-motoring position which energizes the train-line wire 7. The series-parallel controller SPC thereupon picks up, and establishes its parallel-motoring circuits, which are shown in Fig. 7. This entire operation takes place quickly and automatically, assuming that the dynamic-braking operation was discontinued while the motors were still operating at a high speed. Meanwhile, the commencement of the resumption of power-operation, with the series-motor connection initially in effect, avoids the possibility of a jerky operation.

If the dynamic-braking circuit had been left on, until the car-speed had been materially reduced, before a renewed power-application had been called for by the movement of the master-controller MC to an on-position, it will be understood that the limit-relay contact aa in Fig. 1 would have continued to notch the cam-controller CC in the braking-progression direction, as might be necessary for the purpose of maintaining the set braking-current, according to the position of the braking-rheostat 17 in Fig. 1. This notching would continue as long as the power-brake changeover-controller PBC was in its braking-position, so that the cam-controller CC would have been automatically kept adjusted to a suitable controller-position in accordance with the car-speed. If the discontinuance of the dynamic-braking operation had been called for at any car-speed below its highest speed-bracket, the motor-voltages would have been correspondingly reduced, so as to present a less serious switching-problem, and the current $I_J$ of Fig. 7 woul dhave been smaller, so that the field-reduction current-component $I_J$ would approach unimportant values at considerably reduced motor-speeds.

It will also be understood that, in the transition in the other direction—that is, the transition from a power-operation to a dynamic-braking operation—there will also be a brief intermediate time, when the power-brake controller PBC is dropping back, by spring-return, from its power-position, No. 7 in Fig. 4, to its braking-position, No. 1, when the PBC field-reduction contact J1 will be closed and then reopened, after the power-contacts G1 and G11 have been opened. But here, again, the field-reducing current $I_J$ would be of relatively small magnitude, because the motor-current, and hence the motor-flux and the motor-voltage, previous to this operation, would have been relatively small, particularly at high motor-speeds. Here, again, the field-reducing effect of the current $I_J$ would be quite unimportant.

The second novel feature of my invention involves the addition of the series-transition contactor-coil J', which and the current $I_J$ of Fig. 7 would have been smaller, so is connected in series with the dynamic-braking circuit, as shown in Fig. 1. This added coil J' is energized only during the dynamic-braking operation, at which time the battery-energized coil J is deenergized; and the number of turns on the series coil J' are so small that this coil cannot pick up the transition-contactor J until the braking-current reaches an overload magnitude. The series transition-contactor coil J' thus serves as a braking-overload detector, which responds to any serious overload in the dynamic-braking current, and thereupon automatically introduces effective remedial measures. The braking current can reach an overload magnitude when the dynamic-braking circuits are established at a time when cam-controller CC has been operating faultily, so that it has not advanced as far, in its power-progression, as it should have done at the advanced car-speed when the braking-operation is commenced.

Dynamic-braking overload-protection has heretofore involved many objections.

Figure 8:
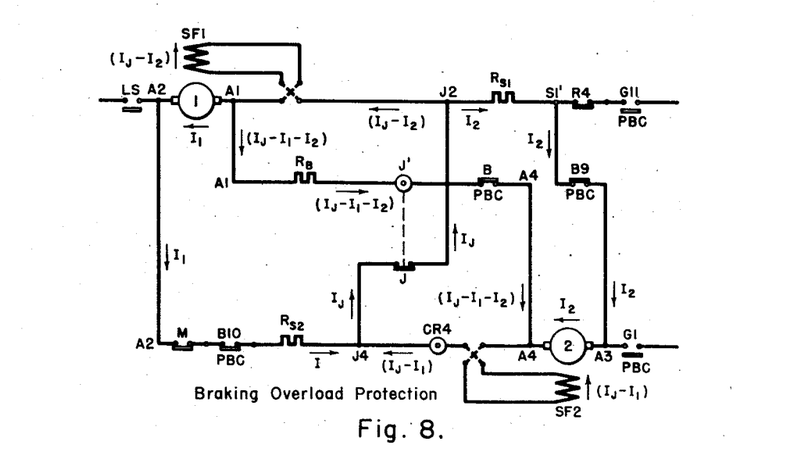

My present invention affords this protection by an entirely new principle of making a field-reducing connection, as by means of an energization of the transition-contactor J, or by any other equivalent means, during the braking operation, whereupon the main contact J of this contactor makes a preferably extremely low-resistance connection between the motor-circuit points J4 and J2, as shown in Fig. 8. This produces the same field-reducing action as was accomplished by the new J1 contact of the power-brake controller PBC in Fig. 6, only (preferably) on a much more severe scale, because of the omission of the circuit-resistance $R_J$ which was present in Fig. 6.

In the event of a braking-overload protective-operation involving the closure of the contact J in Fig. 8, the motor-fields are very quickly reduced, thus reducing the current through the series coil CR4 of the limit-relay CR, so that the limit-relay back-contact aa continuously energizes the braking-progression coil CC—B in Fig. 1 until the cam-controller is moved back to its "off," or No. 1 power-progression, position. Just before the cam-controller reaches this "off" position, the energization of the holding-coil SPC' in the braking-circuit A1—T1 will be so greatly weakened as to drop out the series-parallel controller SPC, causing it to return to its series position, opening its contact j, and breaking the J-contactor holding-circuit 54—56—j—57—p—53 which had been energizing the battery-energized transition-contactor coil J in Fig. 1. This causes the transition-contactor J to drop out, in readiness for another power-operation of the traction-motors.

An advantage of my new braking-overload protection-system, shown in Fig. 8, is that it takes advantage of the fact that an incipient braking-overload takes a certain finite amount of time for the motor-fluxes, voltages and currents to increase to their full overload values. My new overload protective scheme detects the beginnings of the overload-buildup of the braking-current, and starts immediately to reduce this current, so that the overload-current never reaches its full buildup or peak-value. Thus, my braking switches can be smaller, because they can be designed for substantially their normal braking-duty, rather than for overload-duty. Furthermore, my new overload protection-scheme does not require the cost and the circuit-complication which would be involved in the provision of a separate overload relay and breaker for securing this protection.

In securing the braking-overload protection, it is convenient, as shown in Fig. 8, to make use of the transition-switch J which is always necessary in any modern series-parallel traction-motor control. Also, in making the field-reduction connection J1, as a preliminary to discontinuing a full-speed high-braking-current operation, as shown in Fig. 6, it is also convenient to use an extra contact J1 on the power-brake changeover-controller PBC. In a general sense, however, my invention contemplates the provision of the appropriate connection between the motor-circuit points J4 and J2, or any similar points in the motor-circuits, regardless of what contacts, or how many contacts, are used in establishing and safeguarding this connection.

While my invention is particularly advantageous in traction-motor control-systems using a cam-controller which progresses in one direction during acceleration, and in the opposite direction during dynamic braking, and while my invention is particularly advantageous in a plural-motor dynamic-braking scheme in which the braking-current of each motor-armature excites the series field-winding of another motor, my invention is not altogether limited to these particular schemes.

The foregoing and other changes may be made, therefore, without departing from the broader aspects of my invention.

I claim as my invention:

1. In combination, a series direct-current motor having an armature and a series field-winding, a direct-current supply-circuit, a power-operating means for at times connecting said series motor to said supply-circuit, and a dynamic-braking means including at least the following elements: a means for disconnecting said armature from said supply-circuit, a means for connecting a braking-resistance across said armature, a means, other than said armature, for supplying a direct-current excitation to said field-winding in the same polarity as the residual magnetism of the motor, and a braking-terminating means for at times connecting the unreversed series winding of said motor in another circuit across the armature of said motor whereby the voltage which is generated in said armature drives a current-component through said field-winding in a flux-reducing direction.

2. In combination, a series direct-current motor having an armature and a series field-winding, a direct-current supply-circuit, a power-operating means for at times connecting said series motor to said supply-circuit, and a dynamic-braking means including at least the following elements: a means for disconnecting said armature from said supply-circuit, a means for connecting a braking-resistance across said armature, a means, other than said armature, for supplying a direct-current excitation to said field-winding in the same polarity as the residual magnetism of the motor, and a sequential-operation braking-terminating means for at times connecting the unreversed series winding of said motor in another circuit across the armature of said motor whereby the voltage which is generated in said armature drives a current-component through said field-winding in a flux-reducing direction, and a means for subsequently opening the circuit containing said braking-resistance while there is still a substantial field-flux in said motor.

3. In combination, a series direct-current motor having an armature and a series field-winding, a direct-current supply-circuit, a power-operating means for at times connecting said series motor to said supply-circuit, and a dynamic-braking means including at least the following elements: a means for disconnecting said armature from said supply-circuit, a means for connecting a braking-resistance across said armature, a means, other than said armature, for supplying a direct-current excitation to said field-winding in the same polarity as the residual magnetism of the motor, and a sequential-operation braking-terminating means for at times connecting the unreversed series winding of said motor in another circuit across the armature of said motor whereby the voltage which is generated in said armature drives a current-component through said field-winding in a flux-reducing direction, a means for subsequently opening the circuit containing said braking-resistance, and a means for subsequently opening said flux-reducing circuit of said field-winding while there is still a substantial field-flux in said motor.

4. In combination, a series direct-current motor having an armature and a series field-winding, a direct-current supply-circuit, a power-operating means for at times connecting said series motor to said supply-circuit, and a dynamic-braking means including at least the following elements: a means for disconnecting said armature from said supply-circuit, a means for connecting a braking-resistance across said armature, a means, other than said armature, for supplying a direct-current excitation to said field-winding in the same polarity as the residual magnetism of the motor, and a sequential-operation braking-terminating and power-restoring means for at times connecting the unreversed series winding of said motor in another circuit across the armature of said motor whereby the voltage which is generated in said armature drives a current-component through said field-winding in a flux-reducing direction, a means for subsequently opening the circuit containing said braking-resistance, a means for subsequently opening said flux-reducing circuit of said field-winding while there is still a substantial field-flux in said motor, and a means for subsequently reconnecting said series motor to the supply-circuit.

5. In combination, a series direct-current motor having an armature and a series field-winding, a direct-current supply-circuit, a power-operating means for at times connecting said series motor to said supply-circuit, and a dynamic-braking means including at least the following elements: a means for disconnecting said armature from said supply-circuit, a means for connecting a braking-resistance across said armature, a means, other than said armature, for supplying a direct-current excitation to said field-winding in the same polarity as the residual magnetism of the motor, and a braking-overload protective-means for responding to a braking-overload condition and for thereupon automatically connecting the unreversed series winding of said motor in another circuit across the armature of said motor whereby the voltage which is generated in said armature drives a current-component through said field-winding in a flux-reducing direction.

No references cited.